United States Patent [19]

Rios

[11] Patent Number: 5,256,912

[45] Date of Patent: Oct. 26, 1993

[54] SYNCHRONIZER APPARATUS FOR SYSTEM HAVING AT LEAST TWO CLOCK DOMAINS

[75] Inventor: Jorge C. Rios, San Jose, Calif.

[73] Assignee: Sun Microsystems, Inc., Mountain View, Calif.

[21] Appl. No.: 812,070

[22] Filed: Dec. 19, 1991

[51] Int. Cl.[5] .......................... H03K 5/13; H03K 3/01; H04L 7/00
[52] U.S. Cl. ..................................... 307/269; 307/480; 328/63; 375/111; 375/118
[58] Field of Search .................... 307/269; 328/63, 72; 375/106, 111, 118

[56] References Cited

U.S. PATENT DOCUMENTS

| | | | |
|---|---|---|---|
| 4,039,960 | 8/1977 | Clark | 328/63 |
| 4,879,481 | 11/1989 | Pathak et al. | 307/243 |
| 4,949,361 | 8/1990 | Jackson | 375/118 |
| 5,022,057 | 6/1991 | Nishi et al. | 328/63 |
| 5,132,990 | 7/1992 | Dukes | 375/111 |

Primary Examiner—Timothy P. Callahan

Attorney, Agent, or Firm—Blakely Sokoloff Taylor & Zafman

[57] ABSTRACT

The present invention, a synchronizer, utlizes a plurality of clocking signals generated by a specialized clocking circuit, in conjunction with synchronizer modules incorporating transparent latches, to synchronize signals passing from a first clock domain to a second clock domain. Two types of synchronizer modules are disclosed, a single synchronizer module and a multiple synchronizer module. Both types of synchronizer modules utilize a "basic synchronizer cell" comprised of two transparent latches in series. The single synchronizer module is comprised of two such basic synchronizer cells, and utilizes a plurality of clocking signals which are coupled to the transparent latches to accomplish synchronization. The multiple synchronizer module, also utilizes a plurality of clocking signals, and is comprised of a plurality of single synchronizer modules coupled in parallel and a synchronizer selector circuit. The multiple synchronizer module operates by initially coupling the signal to be synchronized to the synchronizer selector circuit, which then sequentially couples the signal to successive single synchronizer modules.

9 Claims, 10 Drawing Sheets

BASIC SYNCHRONIZER CELL

SYNCHRONIZER APPARATUS FOR SYSTEM HAVING AT LEAST TWO CLOCK DOMAINS

BACKGROUND OF THE INVENTION

1. Field of the Invention

The present invention relates to the general field of computers and digital design, and more particularly, to an apparatus and method for synchronizing signals travelling between a plurality of clock domains in a larger digital system.

2. Art Background

A larger digital system frequently employs a plurality of digital subsystems. When these digital subsystems operate in conjunction with the same clock in synchronous fashion, synchronization of signals travelling between these digital subsystems is not necessary. However, if these digital subsystems operate in conjunction with different clocks, signals travelling between these digital subsystems must be synchronized.

Assume, for example, that the larger digital system consists of two digital subsystems, each operating in conjunction with a different clock. Signals travelling from the first digital subsystem operating with a first clock (the first clock domain) to the second digital subsystem operating with a second clock (the second clock domain) must be synchronized with the second clock. Similarly, signals travelling in the opposite direction, from the second clock domain to the first clock domain must be synchronized with the first clock. Without such synchronization, metastability problems produce invalid logic results, and the larger digital system fails as a result.

Mestastability arises when the signal input to a flip-flop in a particular clock domain does not meet that flip-flop's set-up or hold time requirements. In essence, in order for a flip-flop in a first clock domain to function properly, its input signal must be stable for a certain period of time before the flip-flop is clocked (set-up time), and remain stable for a certain period of time after the flip-flop is clocked (hold time). A signal from a second clock domain which is not synchronized with the clock of the first clock domain, may not necessarily meet these requirements. As a result, such an input signal can place the flip-flop in a "metastable state" wherein its output is momentarily somewhere between logic 0 and logic 1. Although, the flip-flop eventually settles to a proper logic level after a finite period of time, a period of time termed "the resolution time," during the time the flip-flop is in the metastable state, it produces unpredictable logic results, results which can cause system failure.

Accordingly, a synchronizer circuit must confront and resolve the problem of metastability. In the design of such a synchronizer circuit, a number of other factors are of considerable importance. In particular, the performance of a synchronizer can be assessed by at least three measures. The first measure, termed the mean time between failures (MTBF), indicates how often, on the average, the overall system fails due to synchronizer failure. Ideally, a synchronizer has a very large MTBF, for example 10,000 years, indicating that the overall system fails due to synchronizer failure once every 10,000 years. A second measure, termed the maximum synchronization time (TMS) indicates the maximum number of clock cycles needed to complete the synchronization process. Ideally, this number is small, reflecting a minor delay caused by the synchronizer. A third measure, the maximum transfer rate (MTR) indicates how often, in clock cycles, a signal can be sent through the synchronizer. This number is ideally one, allowing an input signal to be synchronized every cycle.

Prior art synchronizers typically consisted of a number of master/slave flip-flops coupled in series. These prior art designs provided adequate synchronization under certain, limited circumstances. These circumstances included: the use of low clock frequencies, the tolerance of frequent system failures, or the tolerance of appreciable delays introduced by the synchronizer. As a general rule, prior art synchronizers necessarily sacrificed speed in order to obtain a good MTBF value. Thus, in order to prevent frequent system failure, prior art synchronizers introduced substantial synchronization delays.

With recent advances in computers and digital design, speed and performance have been placed at a premium. In computer systems and digital designs demanding high speed and performance, prior art synchronizers prove to be inadequate. As will be described, the present invention provides for a high speed and high performance synchronizer apparatus and method. The present invention provides for optimal synchronization of signals, while introducing minimal synchronizer delay.

SUMMARY OF THE INVENTION

The present invention operates within a larger digital system having at least two clock domains. A synchronizer block synchronizes signals travelling between these domains. The synchronizer block is comprised of a plurality of synchronizer modules and a specialized clock circuit. The specialized clock circuit includes a clock cell circuit for each clock domain receiving synchronized signals. Each clock cell circuit is provided with the clock signal from the domain to which it is associated. From this clock signal, each clock cell circuit generates four clocking signals: a domain master clock 0, a domain slave clock 0, a domain master clock 1, and a domain slave clock 1. Domain slave clock 0 follows domain master clock 0, while domain slave clock 1 follows domain master clock 1. Domain master clock 1 and domain slave clock 1, are skewed by one clock cycle with respect to domain master clock 0 and domain slave clock 0.

The present invention contemplates two types of synchonizer modules, a single synchronizer module, and a multiple synchronizer module. Both of these synchronizer modules are constructed, in large part, using a plurality of "basic synchronizer cells". The "basic synchronizer cell" of the present invention is comprised of two transparent latches coupled in series, as well as two OR gates, an AND gate, a NAND gate, and an inverter. The "basic synchronizer cell" has four inputs and one output signal. The first input is the signal to be synchronized. The second input is a reset signal used to clear the basic synchronizer cell. The third input is a clock signal, domain master clock 0, coupled to the first transparent latch. The fourth input is a clock signal, domain slave clock 0, coupled to the second transparent latch.

The single synchronizer module of the present invention is comprised of two such "basic synchronizer cells" disposed in parallel, and receiving clocking from the specialized clocking circuit. A first "basic synchronizer cell" receives the clocking signals domain master clock 0 and domain slave clock 0, while a second "basic synchronizer cell" receives the clocking signals domain master clock 1 and domain slave clock 1. The single synchronizer module further comprises three master/slave flip-flops, an OR gate, and two NAND gates, one constructed in its OR gate functional equivalent. The single synchronizer module has a plurality of inputs, including the signal to be synchronized, the clock from the transmitting domain, the four clocking signals previously described, and a sync input which is used to bypass the single synchronizer module when the system is operating in a synchronous fashion.

The multiple synchronizer module of the present invention is comprised of a plurality of single synchronizer modules disposed in parallel and a synchronizer selector circuit. The synchronizer selector circuit couples the signal to be synchronized to successive single synchronizer modules every cycle in a round-robin fashion. In operation, the synchronizer selector circuit initially receives the signal to be synchronized from the transmitting domain, then couples the signal to be synchronized to successive single synchronizer modules.

In one embodiment of the present invention providing for synchronization of signals communicated between two domains, the synchronizer block is comprised of a first single synchronizer module, a second single synchronizer module, a first multiple synchronizer module, a second multiple synchronizer module, and a specialized clocking circuit. Such a synchronizer provides for synchronization in both directions, as well as providing for both high performance synchronization and lesser performance synchronization when high performance synchronization is not required.

BRIEF DESCRIPTION OF THE DRAWINGS

Further details are explained below with the help of the examples illustrated in the attached drawings in which.

DETAILED DESCRIPTION OF THE INVENTION

As will be described, the present invention finds application in a digital system having a plurality of clock domains. While the present invention will be described, for purposes of clarity and simplicity, within the context of a digital system having two clock domains with the need to synchronize signals communicated between these two clock domains, it will be appreciated that the present invention is not limited to this two domain context. In particular, the apparatus and method of the present invention can be utilized to synchronize signals in a digital system having a potentially unlimited number of clock domains.

It should also be noted that in the following description for purposes of explanation, numerous details are set forth such as specific frequencies, bandwidths, data paths, etc. in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Figure 1:
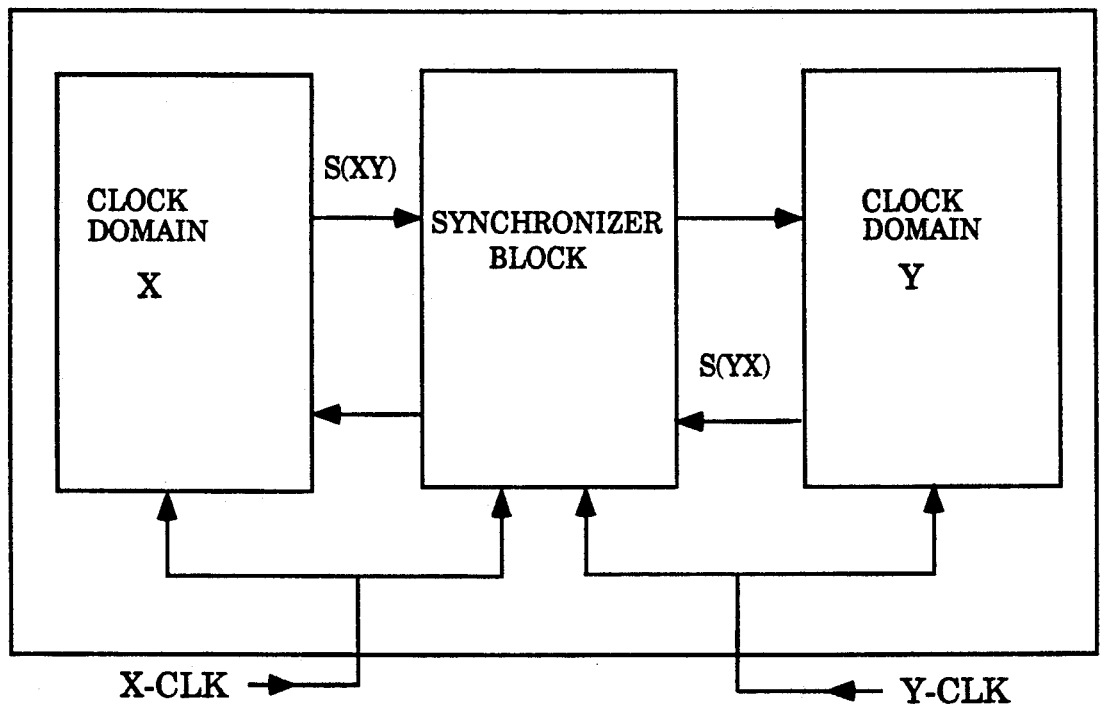
FIG. 1 is a block diagram illustrating the configuration of a digital system having two clock domains and a synchronizer.

Referring now to FIG. 1, this figure illustrates in block diagram form, a digital system having two clock domains and a synchronizer. Such a system can be viewed as being comprised of three major blocks. The first two blocks, clock domain x and clock domain y, contain all the logic elements for each of the two clock domains. The third block, a synchronizer block, contains all the logic elements that are used to synchronize signals passing between the two clock domains. The system also includes an x-clock for providing clocking to clock domain x, and a y-clock for providing clocking to clock domain y.

Signals to be transmitted from clock domain x to clock domain y [S(XY)] are initially coupled from clock domain x to the synchronizer block which then couples the signals to clock domain y. Signals to be transmitted from clock domain y to clock domain x [S(YX)] are initially coupled from clock domain y to the synchronizer block which then couples the signals to clock domain x. As illustrated in FIG. 1, both the x-clock and the y-clock provide clocking to the synchronizer block which utilizes this clocking to accomplish the synchronization of signals.

Figure 2:
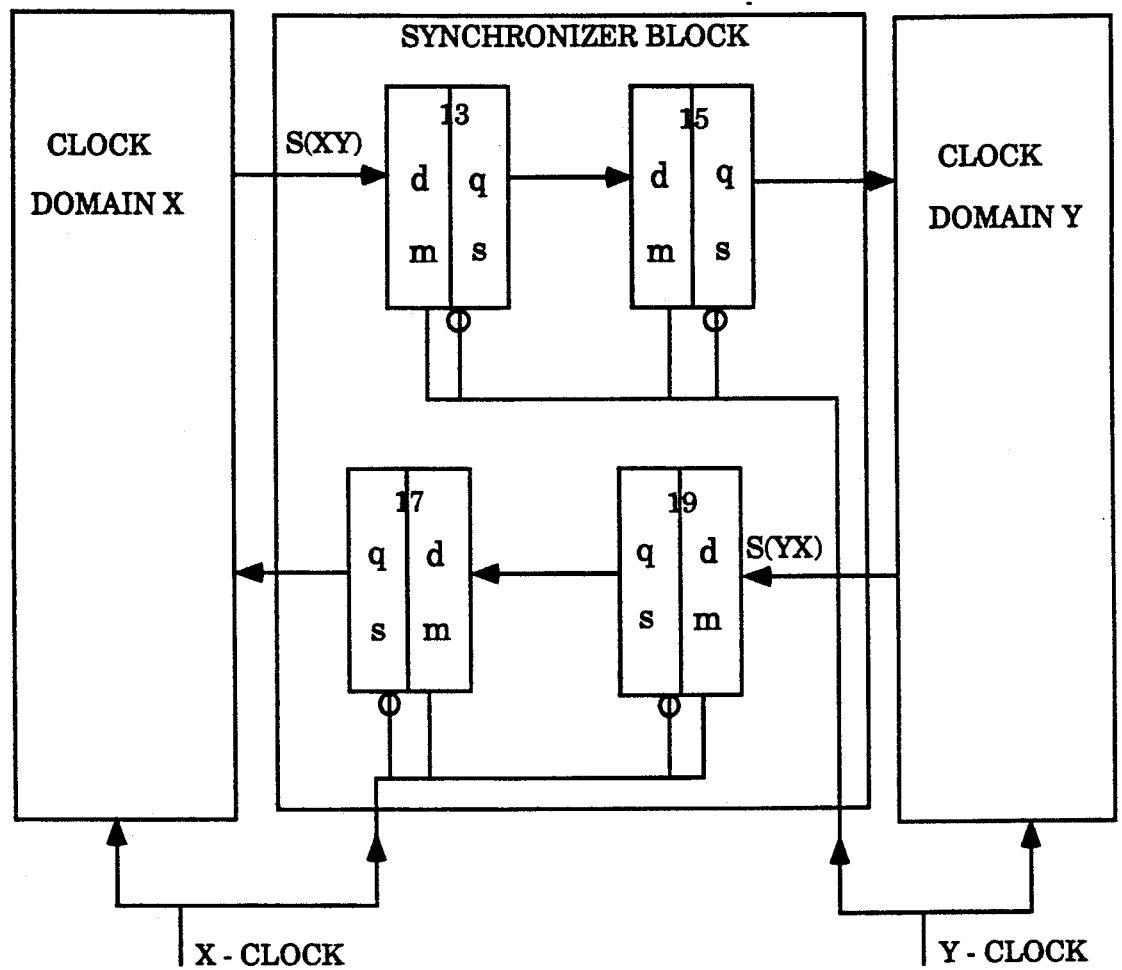
FIG. 2 illustrates a synchronizer circuit found in the prior art incorporating master/slave flip-flops.

Referring now to FIG. 2, this figure illustrates a synchronizer circuit found in the prior art. In this circuit, master/slave flip-flops 13, 15, 17, and 19, are utilized in series to synchronize signals transmitted between the two clock domains. A signal to be transmitted from clock domain x to clock domain y [S(XY)] is initially coupled to master/slave flip-flops 13, coupled to master/slave flip-flop 15. Master/slave flip-flops 13 and 15 are clocked with the y-clock such that when the signal reaches clock domain y, it is synchronized with that domain's clock. Similarly, a signal which is to be transmitted from clock domain y to clock domain x [S(YX)] is initially coupled to master/slave flip-flop 19, then coupled to master/slave flip-flop 17. Master/slave flip-flops 19 and 17, are clocked with the x-clock such that when the signal reaches clock domain x, it is synchronized with that domain's clock.

It will be appreciated that the prior art synchronizer illustrated in FIG. 2 suffers from significant shortcomings. In particular, problems occur when one, or both, of the clock domains operates in conjunction with a high frequency clock. If one assumes, for example, that the y-clock operates at 50 MHz, a problem occurs if the signal input S(XY) causes master/slave flip/flop 13 to go into a metastable state. Such an event, it should be noted, can be expected to take place due to the fact that the signal S(XY) is issued from clock domain x, operating according to the x-clock, then coupled to master/slave flip-flop 13, operating according to the y-clock. If master/slave flip-flop 13 is placed in a metastable state, because the y-clock is operating at such a high frequency, master/slave flip-flop 13 is not able to resolve its logic state before master/slave flip-flop 15 latches the output of flip-flop 13, and the synchronizer fails.

Accordingly, when operating at high frequencies, the synchronizer illustrated in FIG. 2 yields a very low mean time between failures (MTBF), causing an unacceptable level of failures for the larger system. One solution to this problem is to simply divide a high frequency clock such that the clocking to the master/slave flip-flops no longer takes place at an unacceptably high frequency. For example, referring again to FIG. 2, if the y-clock for clock domain y is 50 MHz, the clock signal can be divided to a more manageable 25 MHz before being provided to master/slave flip-flops 13 and 15. While this solution can resolve the problem associated with metastability, thereby providing a good MTBF, this solution clearly slows the speed and performance of the synchronizer.

Speed and performance, however, have taken on increased significance in recent digital designs for computer systems. Recent digital designs demand the use of high frequency clocking, while also requiring minimal system failures, and little if any synchronizer delay. The trend toward high speed and high performance can be expected to continue, as faster and faster computer systems are designed and implemented. Accordingly, significant motivation is provided for the design of a sychronizer which offers high performance at high frequencies.

Figure 3:
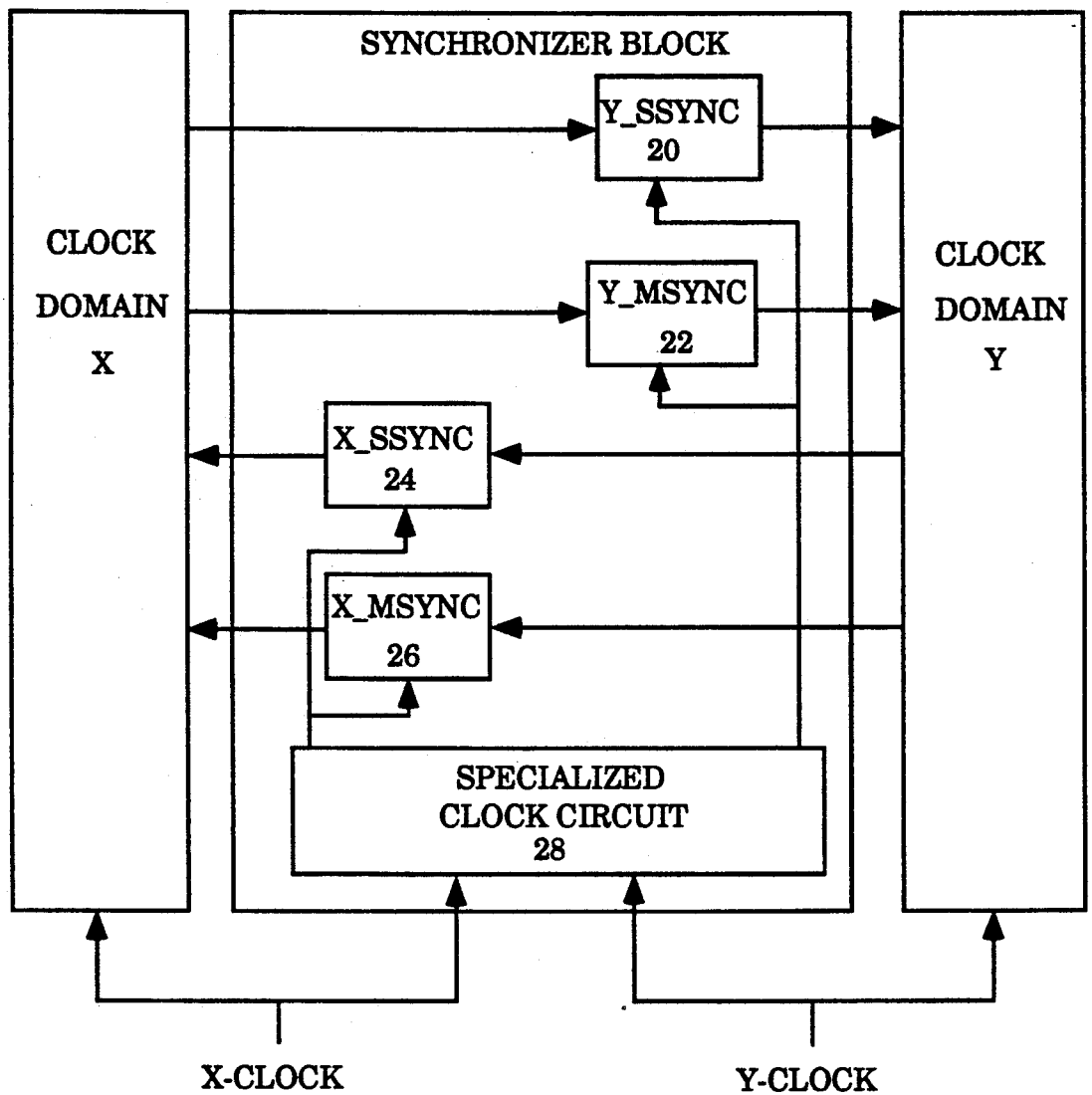
FIG. 3 is a block diagram of one embodiment of the present invention illustrating the five modules of the synchronizer block.

FIG. 3 illustrates, in block diagram form, one embodiment of the present invention. For the sake of simplicity and clarity, this figure illustrates the embodiment within the context of a larger system having only two clock domains. It will be appreciated, as discussed earlier, that the present invention is not limited to this particularcontext. As can be seen from FIG. 3, the synchronizer block is comprised of five modules including: a y domain single synchronizer 20 (y_ssync), a y domain multiple synchronizer 22 (y_msync), an x domain single synchronizer 24 (x_ssync), an x domain multiple synchronizer 26 (x_msync), and a specialized clock circuit 28. As will be explained, while FIG. 3 illustrates the presently preferred embodiment comprised of five modules, the present invention also contemplates numerous alternative embodiments, including a high performance embodiment comprised of three modules, a y domain multiple synchronizer, an x domain multiple synchronizer and a specialized clock circuit.

Referring to FIG. 3, signals to be transmitted from clock domain x to clock domain y are initially coupled to either the y domain single synchronizer 20, or the y domain multiple synchronizer 22. As will be explained, the choice of whether to use the single or the multiple synchronizer will depend on the characteristics of the signals to be transmitted. Regardless of whether the y domain single synchronizer 20, or the y domain multiple synchronizer 22 is utilized, the signal is then synchronized by the synchronizer moduleand coupled to clock domain y. In a similar fashion, signals to be transmitted from clock domain y to clock domain x are initially coupled to either the x domain single synchronizer 24, or the x domain multiple synchronizer 26, synchronized, and coupled to clock domain x. As can be seen from this figure, the specialized clock circuit 28 receives clocking from both the x-clock and the y-clock. From these clocks, the specialized clock circuit 28 generates and provides a plurality of special clocking signals to the y domain single synchronizer 20, the y domain multiple synchronizer 22, the x domain single synchronizer 24, and the x domain multiple synchronizer 26. The specialized clock circuit 28 will now be described.

Figure 4:
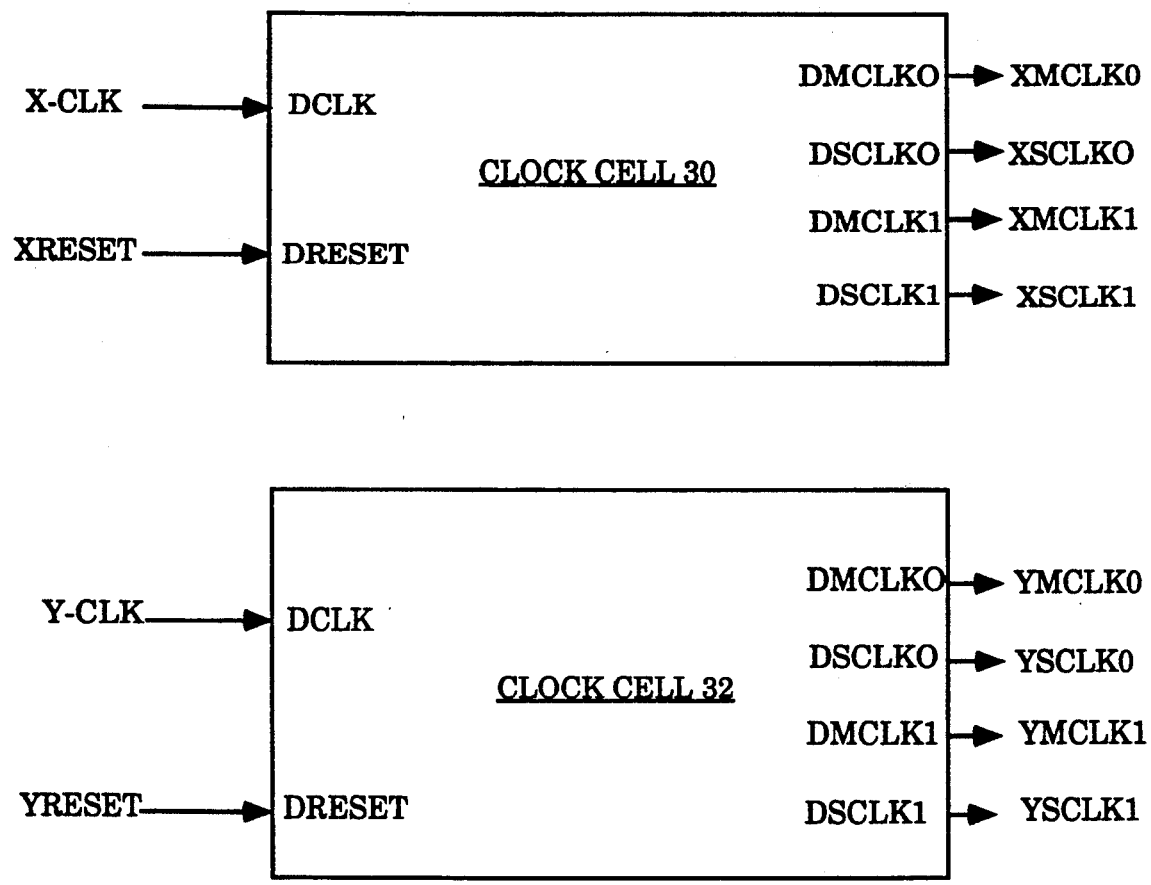
FIG. 4 is a block diagram of the clock cells within the specialized clock circuit illustrating the signal inputs and signal outputs of the clock cells.

FIG. 4 illustrates, in block diagram form, the two clock cells 30 and 32 which comprise the specialized clock circuit 28 shown in FIG. 3. The present invention contemplates the incorporation of at least one clock cell in the specialized clock circuit for each clock domain receiving signals which must be synchronized. Therefore, FIG. 4, correspondingly, illustrates two clock cells, clock cell 30 and clock cell 32. Clock cell 30 receives the x domain clock signal and reset signal, and outputs four clock signals: x master clock 0 (xmclk0), x slave clock 0 (xsclk0), x master clock 1 (xmclk1), and x slave clock 1 (xsclk1). In similar fashion, clock cell 32 receives the y domain clock signal and reset signal, and outputs four clock signals: y master clock 0 (ymclk0), y slave clock 0 (ysclk0), y master clock 1 (ymclk1), and y slave clock 1 (ysclk1).

Figure 5:
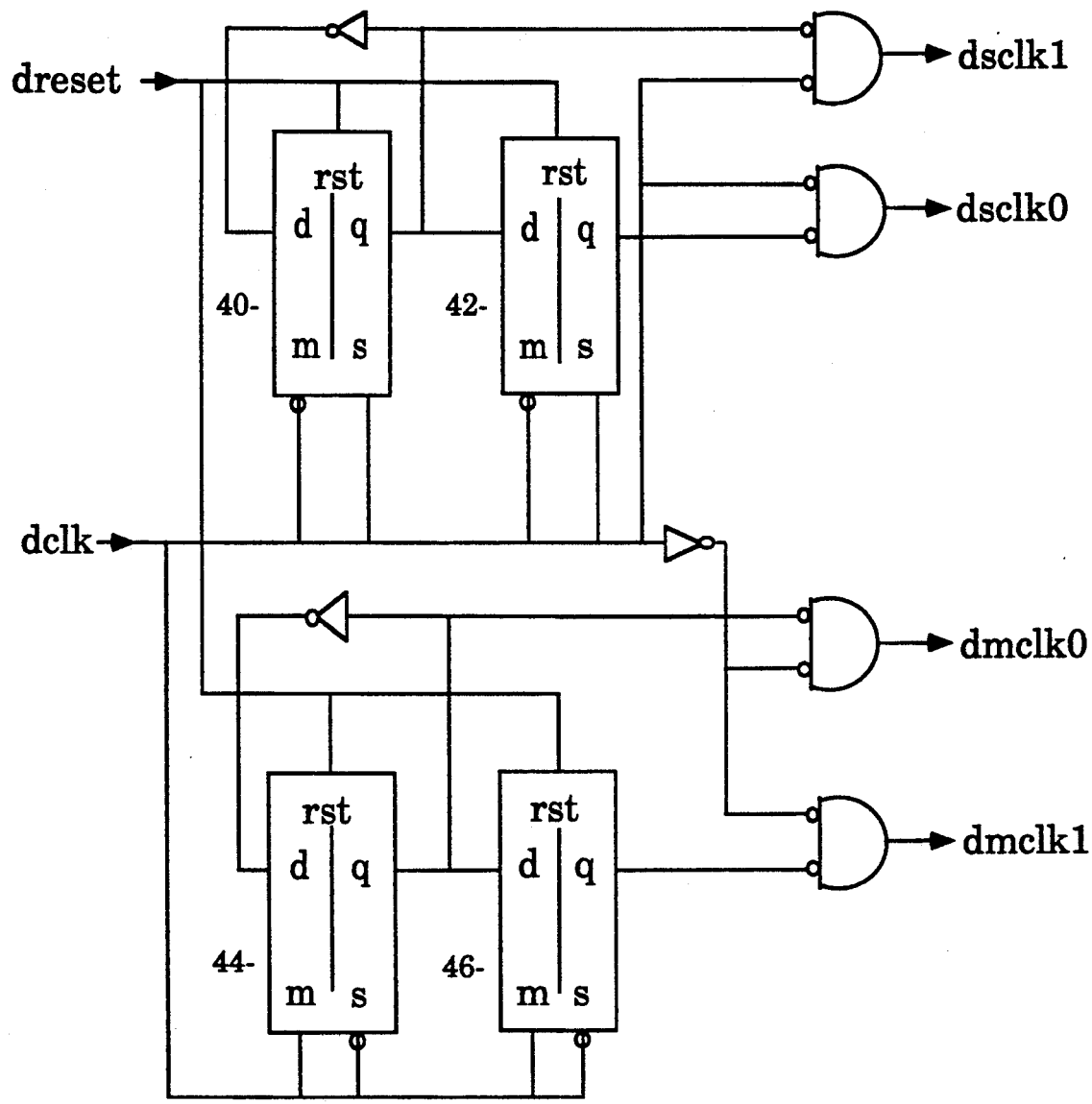
FIG. 5 illustrates a generalized clock cell circuit.

Referring now to FIG. 5, this figure illustrates the generalized clock cell circuit of the present invention. In this figure, the inputs to the clock cell circuit have been given generalized designations, the first corresponding to a clock domain's clocking signal (dclk), and the other corresponding to a clock domain's reset (dreset). The input "dclk" would, for example, correspond to the x-clock in the case of clock cell 30 shown in FIG. 4. As can be seen from FIG. 5, the clock cell includes four master/slave-flip flops 40, 42, 44, and 46, coupled to a plurality of logic gates. Flip-flops 40 and 42 are rising edge flip-flops, changing on the rising edge of a clock signal, while flip-flops 44 and 46 are falling edge flip-flops, changing on the falling edge of a clock signal.

Figure 6:
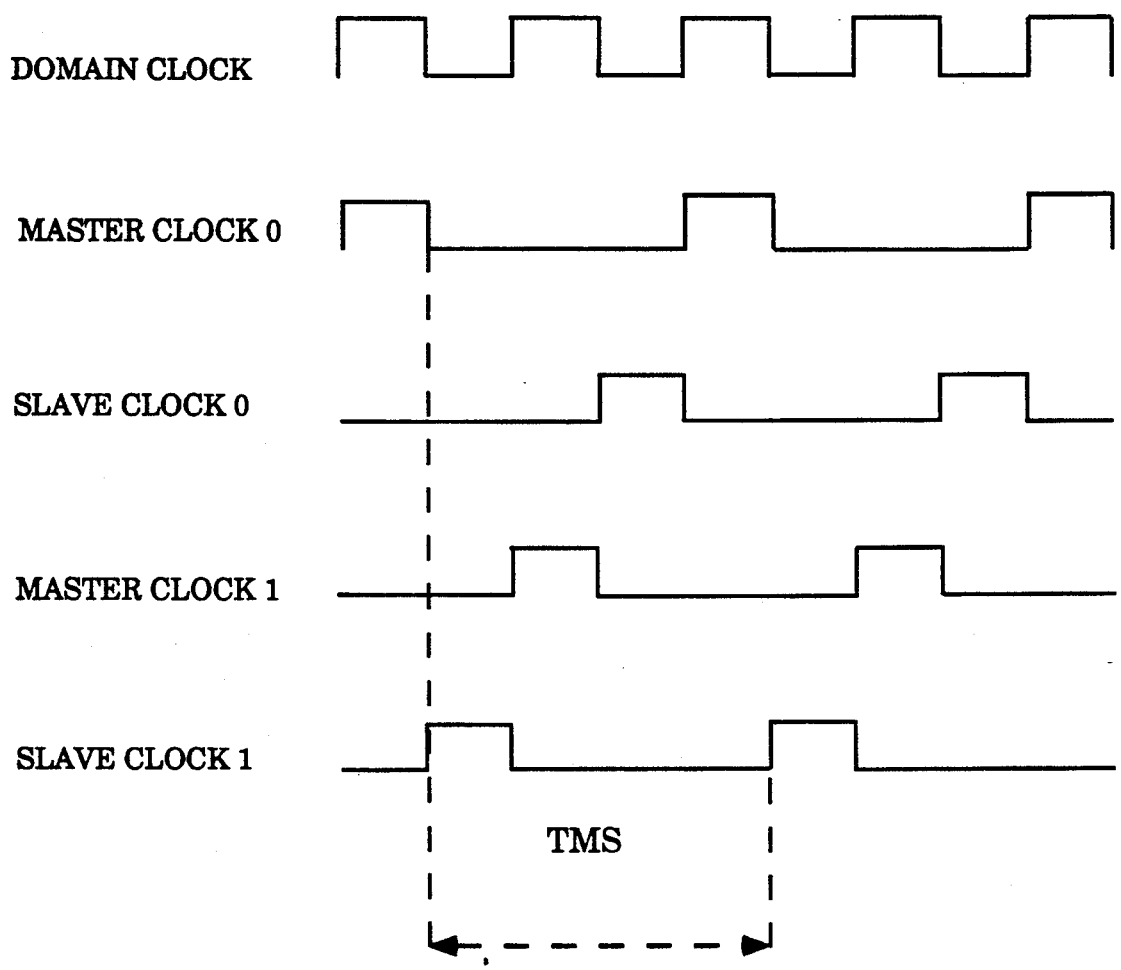
FIG. 6 is a timing diagram illustrating the output clocks resulting from the clock cell circuit and the relationship of these clocks to the domain clock.

Referring now to FIG. 6, this figure illustrates the clock signals resulting from the clock cell circuit shown in FIG. 5. Referring now to both FIGS. 5 and 6, the clock cell operates as follows. Initially, the domain reset for the clock cell circuit is asserted. This causes domain master clock 0 (dmclk0) and domain master clock 1 (dmclk1), to follow the domain clock with the same polarity. The outputs for the domain slave clock 0 (dsclk0) and domain slave clock 1 (dsclk1) also follow the domain clock; however, they are 180 degrees out of phase. Once reset is negated, the clock circuit generates the clock signals illustrated in FIG. 6.

As will be described, these clock cell signals are provided to the synchronizer modules of the present invention. Returning briefly to FIG. 3, these synchronizer modules include the y domain single synchronizer 20, the y domain multiple synchronizer 22, the x domain single synchronizer 24, and the x domain multiple synchronizer 26. These synchronizer modules are constructed, in large part, using a plurality of "basic synchronizer cells." The "basic synchronizer cell" of the present invention will now be described.

Figure 7:
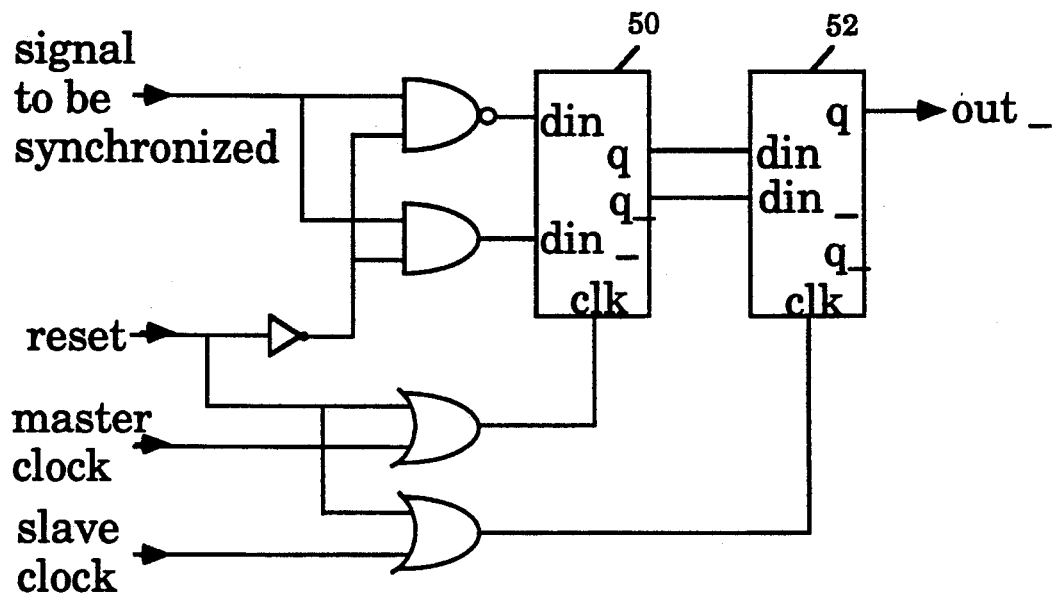
FIG. 7 illustrates the "basic synchronizer cell" of the present invention.

Referring now to FIG. 7, the "basic synchronizer cell" of the present invention is illustrated. As illustrated in FIG. 7, the "basic synchronizer cell" of the present invention is comprised of two transparent latches 50 and 52, two OR gates, an AND gate, a NAND gate, and an inverter. The "basic synchronizer cell" has four inputs and one output signal. A first input accepts the signal to be synchronized. A second input accepts a reset signal used to clear the synchronizer circuit. A third input accepts a clock signal, the master clock signal, which is coupled to the transparent latch 50. A fourth input accepts a clock signal, the slave clock signal, which is coupled to the transparent latch 52.

The present invention's use of transparent latches, rather than master/slave flip-flops within a synchronizer differs from the design of prior art synchronizers. (See, for example, FIG. 2.) A transparent latch, it will be appreciated, differs from a master/slave flip-flop in that the output of the transparent latch "sees through" to the input of the transparent latch. The use of transparent latches advantageously provides for space savings, a critical concern when considering the manufacture of a synchronizer circuit on a chip. As will be explained, the present invention also advantageously clocks transparent latches 50 and 52 in a prescribed fashion.

The "basic synchronizer cell" operates in two modes: reset mode and synchronization mode. The reset mode is entered into whenever the reset input is asserted. When the reset input is asserted, the clock inputs for transparent latch 50 and 52 are forced high, while the input (din) to transparent latch 50 is also forced high. This causes the output signal to go high. Thus, the output signal is always high as long as the reset signal input is active high. In the presently preferred embodiment, output high is considered inactive. However, it will be appreciated that the present invention is in no way limited to this choice.

Figure 8:
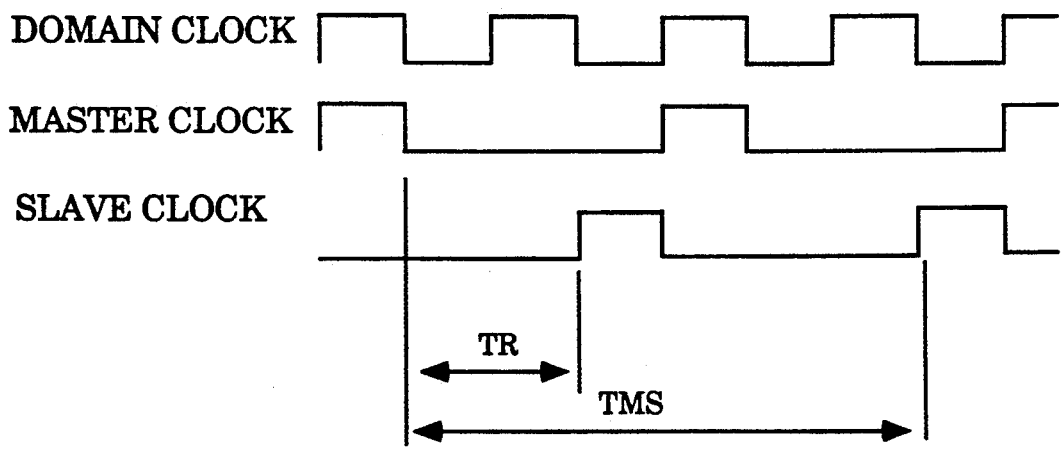
FIG. 8 illustrates a timing diagram of the master and slave clocks provided to the "basic synchronizer cell," and their relationship to the domain clock.

In order to understand the operation of the "basic synchronizer cell" in synchronization mode, reference is first made to FIG. 8. This figure illustrates the clock signals, the master clock and the slave clock, provided to the basic synchronizer cell when operating in synchronization mode. It will be appreciated by reference to both FIGS. 6 and 8, that FIG. 8 illustrates clocking signals comparable to the Master clock 0 and Slave Clock 0 shown in FIG. 6.

Referring now to both FIGS. 7 and 8, the operation of the "basic synchronizer cell" in synchronization mode will now be described. The input is synchronized in the following manner. First, with the reset inactive, the input signal is inverted by the NAND gate. When the master clock makes the negative transition (high to low), the asynchronous signal is latched in transparent latch 50. At this point, the output of transparent latch 50 may pass into a metastable state if the asynchronous signal input did not meet the set-up or hold time requirements for the latch. Transparent latch 52 allows transparent latch 50 one full clock cycle to settle to a valid logic value if it went into a metastable state. One cycle after the master clock made the negative transition, the slave clock, which is coupled to transparent latch 52, goes from low to high. Thus, the output of transparent latch 50 is propagated to the output of transparent latch 52, and the input signal has been synchronized with the new clock domain.

Referring to FIG. 7, it will be appreciated that if the output of transparent latch 50 settles into an inactive state after passing into a metastable state, the synchronizer will take three clock cycles to synchronize the input signal. For example, referring to FIGS. 7 and 8, if the signal to be synchronized arrives at this input, and causes transparent latch 50 to pass into a metastable state, the output can settle into either one of the two possible logic values. In a worst case scenario, the transparent latch settles into the inactive state. Under such circumstances, the signal will not be synchronized until the slave clock, thereafter, makes its second transition. This maximum synchronization time of three cycles is indicated with the term "Tms," spanning three clock cycles shown in FIG. 8. As will be described, the single synchronizer module of the present invention effectively reduces the maximum synchronization time, seemingly mandated by the "basic synchronizer cell," by placing two such cells in parallel, and skewing the clocking for each cell by one cycle.

Figure 9:
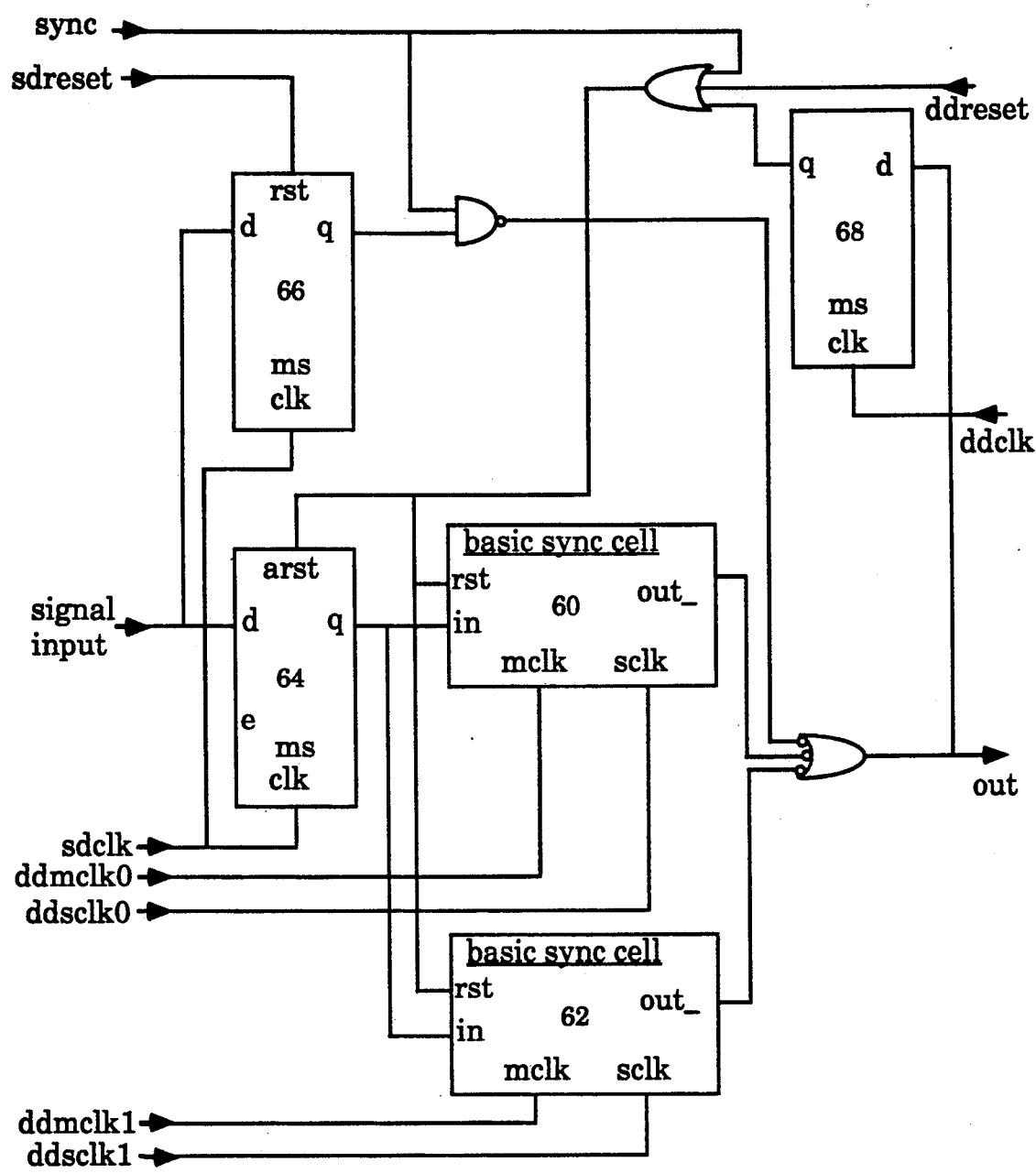
FIG. 9 illustrates the single synchronizer module of the present invention.

Referring now to FIG. 9, this figure illustrates the circuitry of the single synchronizer module of the present invention. This circuitry corresponds to the circuitry found in the y domain single synchronizer 20 and the x domain single synchronizer 24 shown in FIG. 3. In the discussion which follows, the term "source domain" corresponds to the clock domain which is transmitting the signal, while the term "destination domain" corresponds to the clock domain receiving the synchronized signal. In a corresponding fashion, the term "source domain clock" corresponds to the clock signal from the source domain, while the term "destination domain clock" corresponds to the clock signal from the destination domain.

As can be seen from FIG. 9, the single synchronizer module of the present invention includes two basic synchronizer cells 60 and 62. The single synchronizer module further comprises master/slave flip-flops 64, 66, and 68, an OR gate, and two NAND gates, one illustrated in its OR functional equivalent form. (Signals are considered active low). The single synchronizer module has ten inputs. The signal transmitted from the source domain to be synchronized and provided to the destination domain is provided to the input designated "signal input." The source domain clock input (sdclk) couples the source clock signal to master/slave flip-flops 64 and 66. The destination domain clock input (ddclk) couples the destination clock to master/slave flip/flop 68. The destination domain reset (ddreset) accepts a reset signal from the destination domain, while the source domain input (sdreset) accepts a reset signal from the source domain.

Four clocking signal inputs are provided: the destination domain master clock 0 (ddmclk0), destination domain slave clock 0 (ddsclk0), destination domain master clock 1 (ddmclk1), destination domain slave clock 1 (ddmclk1). In the preferred embodiment of the present invention, the specialized clocking circuit 28, as described in reference to FIGS. 3, 4, 5, and 6 couples the four clocking signals generated from the destination domain to these four clocking signal inputs. In particular, referring again to FIG. 5, the destination domain necessarily has an associated clock cell circuit. This clock cell circuit is provided with the destination domain's clock signal which is coupled to the input for the clock cell (dclk). The clock cell thereby outputs four clock signals, which in turn, are coupled to the four clocking inputs illustrated in FIG. 9.

A final input to the single synchronizer module of the present invention is the sync input. The sync input is asserted when both clock domains are actually operating with the same clock in synchronous fashion. Under such circumstances, synchronizing the signals is unnecessary and exacts a performance penalty on the system. The present invention, therefore, provides for a synchronous bypass mode. When the sync input is asserted, the basic synchronizer cells and flip-flop 64 are reset. The input signal is latched by flip-flop 66 on the rising edge of the source clock, then propagated to the output of this module. Note that the outputs from the basic synchronizer cells 60 and 62 are inactive (logic 1). Thus, when the sync input is asserted, the synchronization process is effectively bypassed.

When the sync input is not asserted, the output of the flip-flop 66 is blocked from being propagated to the output of the synchronizer due to the NAND gate, and the circuit functions as a synchronizer. The signal input is initially latched in flip-flop 64 on the rising edge of the source clock which provides clocking to flip-flop 64. The input signal is effectively stored here until the asynchronous reset (arst) input to flip-flop 64 is asserted. Such a reset occurs one cycle after the synchronized output signal becomes valid. The output of flip-flop 64 is then coupled to two basic synchronizer cells 60 and 62 disposed in parallel. Basic synchronizer cell 60 receives the clock signals ddm0clk and dds0clk. Basic synchronizer cell 62 receives the clock signals ddm1clk and dds1clk. After a maximum of two clock cycles, at least one of the synchronizer cells will assert its output. This output will drive the out signal of the single synchronizer module. The output signal is also latched in master/slave flip-flop 68 to asynchronizely clear flip-flop 64.

With reference to FIGS. 6 and 9, it will be appreciated that the present invention's use of the clocking signals ddm0clk, dds0clk, ddm1clk, and dds1clk, in conjunction with the two basic synchronizer cells 60 and 62 disposed in parallel, yields a maximum synchronization time of two clock cycles. This results from the fact that the master and slave clock signals for basic synchronizer cell 62 are skewed by one clock cycle with respect to the master and slave clock cycles for basic synchronizer cell 60. This maximum synchronization time "TMS" of two cycles is indicated in FIG. 6.

Figure 10:
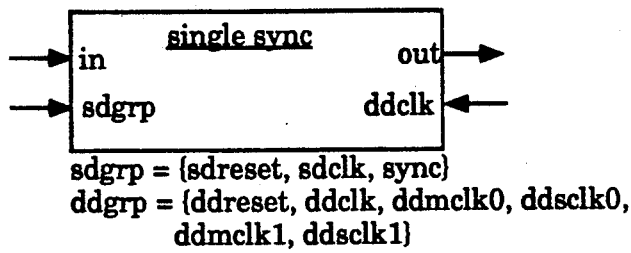
FIG. 10 illustrates a symbolic block diagram representation of the single synchronizer module of the present invention.

Referring now to FIG. 10, a symbolic block representation of the single synchronizer module is illustrated. This block representation includes the data input (din), and the synchronizer module output (out). Signals associated with the source domain, including the source domain reset (sdreset), the source domain clock (sdclk) and the sync signal, are provided to the source domain group input (sdgrp). Signals associated with the destination domain, including the destination domain reset (ddreset), the destination domain clock (ddclk) and the clock signals derived from the destination domain clock, ddmclk0, ddsclk0, ddmclk1, and ddsclk1, are provided to the destination group input (ddgrp).

Figure 11:
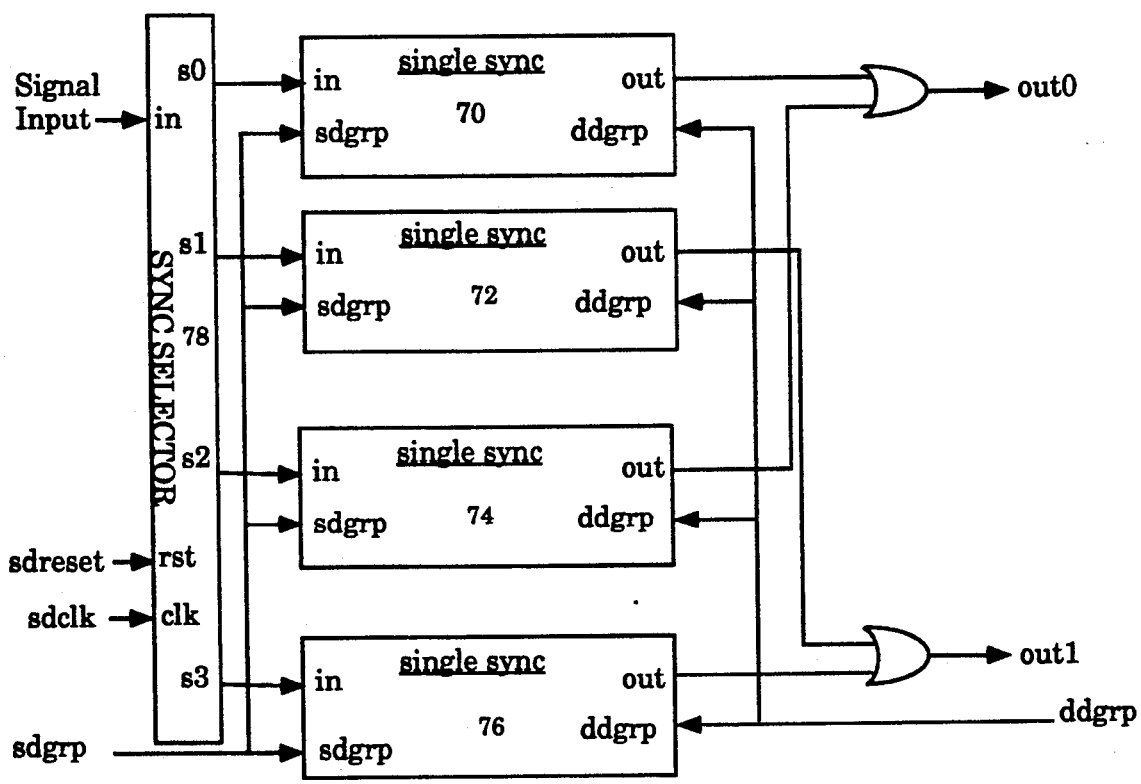
FIG. 11 illustrates the multiple synchronizer module of the present invention.

Referring now to FIG. 11, this figure illustrates the multiple synchronizer module of the present invention. The circuitry illustrated in FIG. 11 corresponds to the circuitry found in the y-domain multiple synchronizer 22 and the x-domain multiple synchronizer 26 illustrated in the general block diagram of FIG. 3. The multiple synchronizer module of the present invention comprises four single synchronizer modules 70, 72, 74, and 76 arranged in parallel and coupled to a synchronizer selector circuit 78. The synchronizer selector circuit 78 couples the signal to be synchronized to successive single synchronizer modules every cycle in a round-robin faction.

Referring to FIG. 11, the signal to be synchronized, the source domain reset (sdreset), and the source domain clock (sdclk) are coupled to the synchronizer selector circuit 78. The source doamin group signals, the source domain reset (sdreset), the source domain clock (sdclk) and the sync signal are coupled to the source domain group inputs of single synchronizer modules 70, 72, 74, and 76. The destination group signals, including the destination domain reset (ddreset), the destination domain clock (ddclk) and the four clock signals derived from the destination domain clock, ddm0clk, dds0clk, ddm1clk, and dds1clk, are coupled to the destination domain group inputs of single synchronizer modules 70, 72, 74, and 76. The outputs of single synchronizer modules 70 and 74 are coupled to a first OR gate, which provides the output designated out0. The outputs of single synchronizer modules 72 and 76 are coupled to a second OR gate, which provides the output designated out1.

In operation, the multiple synchronizer illustrated in FIG. 11 operates as follows. The synchronizer selector circuit 78 receives the signal to be synchronized from the source domain. The synchronizer selector circuit 78 then acts like a rotating switch providing, in sequential fashion, the signal to be synchronized to successive single synchronizer modules. Initially, the synchronizer selector circuit 78 couples the signal to be synchronized to single synchronizer module 70. After one source clock cycle, the signal to be synchronized is coupled to single synchronizer module 72. Following another source clock cycle, the signal to be synchronized is coupled to single syncronizer module 74. After another source clock cycle, the signal to be synchronized is coupled to single synchronizer module 76. Following yet another clock cycle, the process is begun anew as the signal to be synchronized is coupled, again, to single synchronizer module 70.

Figure 12:
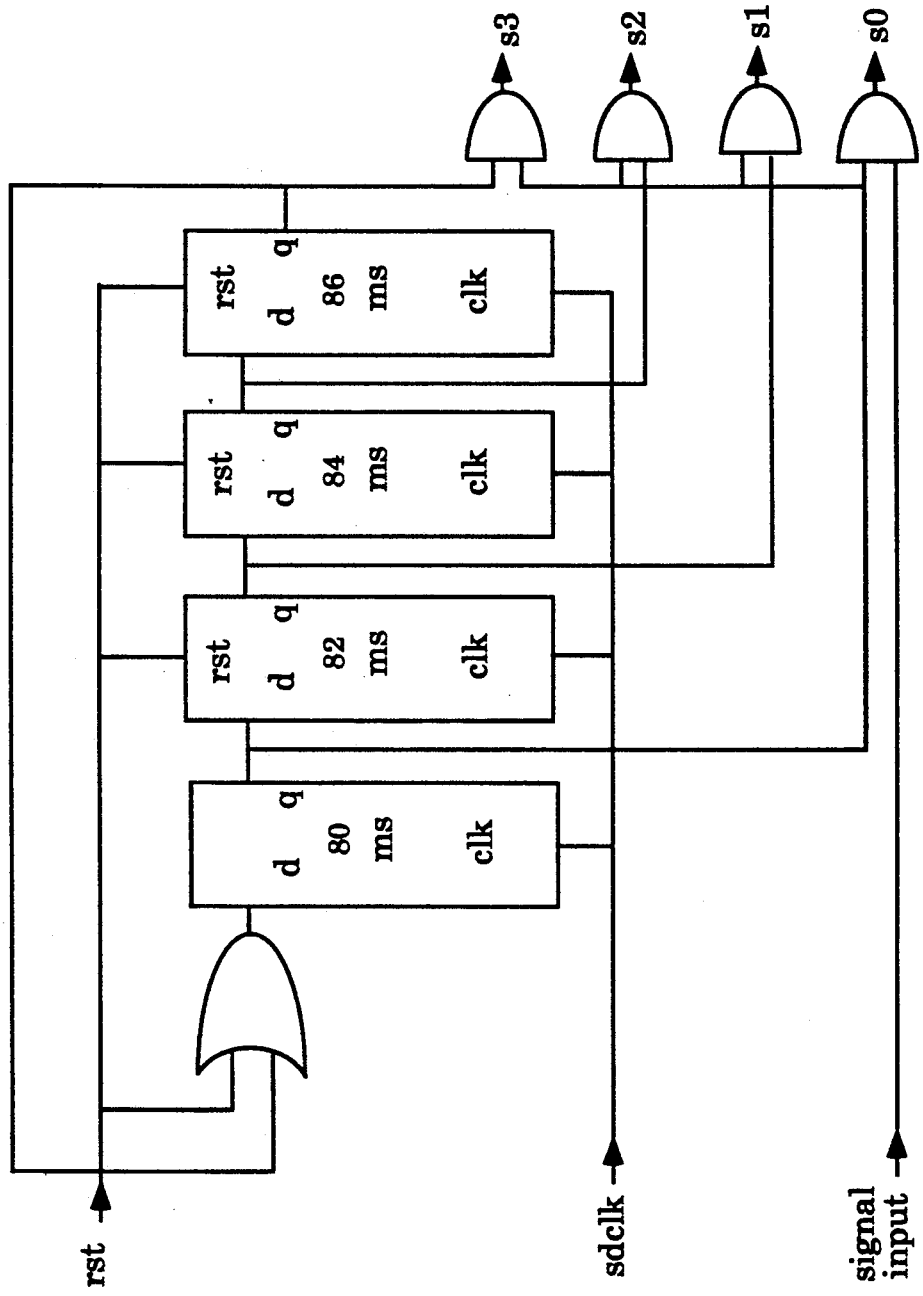
FIG. 12 illustrates one possible synchronizer selector circuit which is utilized in the multiple synchronizer module.

FIG. 12 illustrates an example of one possible synchronizer selector circuit. It will be appreciated that the present invention is not limited to this particular synchronizer selector circuit. In particular, alternatively, a conventional counter circuit can be utilized. This circuit comprises four master/slave flip-flops 80, 82, 84, and 86 coupled together in series. The source clock, source reset, and signal to be synchronized are provided as inputs, while the signals s0, s1, s2, and s3 comprise the outputs. In operation, the flip-flops are initally reset, and thereafter under control of the source domain clock, the outputs for flip-flops 80, 82, 84, and 86 are enabled sequentially. These outputs and the signal to be synchronized are coupled to AND gates as illustrated in FIG. 12. Thus, referring to both FIGS. 11 and 12, the signal outputs, s0, s1, s2, and s3 are coupled to single synchronizer modules 70, 72, 74, and 76 in sequential fashion.

It will be appreciated that the multiple synchronizer module shown in FIG. 11 can receive an input signal every clock cycle while the single synchronizer module shown in FIG. 9 can receive an input signal once every 4 clock cycles. Referring to FIG. 9, once a signal to be synchronized is provided to flip flop 64, no further input is accepted until flip-flop 64 has been cleared. This takes place after four clock cycles. The maximum transfer rate of this synchronizer, therefore, is $(1/(Tms+1))$, that is one item of information every $Tms+1$ clock cycles. This can present a problem because some control signals need to synchronized more frequently than once every $Tms+1$ clock cycles.

The solution to this problem is the multiple synchronizer module shown in FIG. 11. Here, Tms+1 single synchronizer modules are used, in this case four modules, 70, 72, 74, and 76. These single synchronizer modules are placed in parallel, and a synchronizer selector circuit 78 selects a synchronizer module to use every cycle in a round-robin faction. It will be appreciated that each of the single synchronizer modules is capable of synchronizing an input signal. Thus, the multiple synchronizer module illustrated in FIG. 11 is optimally used to synchronize signals when the input signals must be synchronized more frequently than once every Tms+1 clock cycles. Alternatively, the single synchronizer module illustrated in FIG. 9 can be used when a maximum transfer rate of once every Tms+1 clock cycles suffices.

Returning now to FIG. 3, it will be appreciated that the choice of whether to use a single synchronizer module or a multiple synchronizer module to synchronize particular signals depends upon the nature and demands of the signals to be synchronized. When a high transfer rate is demanded, a multiple synchronizer module, for example, multiple synchronizer module 22 or 26, should be utilized. When the nature of particular signals does not demand a transfer rate beyond once every Tms+1 cycles, a single synchronizer module, for example, single synchronizer module 20 or 24, should be utilized. Thus, the digital designer designs the overall digital system taking into consideration the nature of the signals to be synchronized, coupling the modules within the synchronizer block to the clock domains accordingly. In one embodiment of the present invention, the synchronizer block is disposed between two clock domains within a cache controller and includes: a y domain single synchronizer, a y domain multiple synchronizer, an x domain single synchronizer, and a specialized clock circuit.

It will be appreciated that the present invention encompasses a number of possible embodiments for the synchronizer block. An exclusively high transfer rate synchronizer block can be designed with only multiple synchronizer modules and a specialized clock circuit. Such an exclusively high transfer rate synchronizer block can include one or two multiple synchronizer modules depending on the need to transfer signals in one or both directions. Alternatively, the present invention encompasses a synchronizer block comprised of only single synchronizer modules and a specialized clock circuit. Again, such a synchronizer can include one or two single synchronizer modules depending on the need to transfer signals in one or both directions. Additionally, the present invention encompasses synchronizer blocks utilizing hybrids, or combinations, of the single synchronizer module and the multiple synchronizer module, along with the specialized clock circuit. The present invention, thus, contemplates a potentially unlimited number of combinations of single synchronizer modules and multiple synchronizer modules.

While the present invention has been particularly described with reference to FIGS. 1 through 12 and with emphasis on certain digital designs, it should be understood that the figures are for illustration only and should not be taken as limitations upon the invention. In addition, it is clear that the methods and apparatus of the present invention have utility in any application wherein a signals travelling between two clock domains must be synchronized. It is contemplated that many changes and modifications may be made, by one of ordinary skill in the art, without departing from the spirit and scope of the invention as disclosed above.

I claim:

1. A synchronizer for synchronizing signals coupled from a first clock domain operating in accordance with a first clock with a first clock signal having a first frequency, to a second clock domain operating in accordance with a second clock with a second clock signal having second clock pulses at a second frequency, said synchronizer comprising:

clock circuit means for generating a plurality of different clock signals, said plurality of different clock signals including a first master clock signal having at least one first master clock pulse in phase with said second clock signal, and a first slave clock signal having at least one first slave clock pulse 180 degrees out of phase with said second clock signal;

synchronizer circuit means, coupled to said clock circuit means, wherein said synchronizer circuit means utilizes said plurality of different clock signals to synchronize said signals to be synchronized, said synchronizer circuit means having:

a first synchronizer cell circuit comprised of a first plurality of transparent latches;

a second synchronizer cell circuit comprised of a second plurality of transparent latches;

wherein said first synchronizer cell circuit is coupled to said second synchronizer cell circuit.

2. The synchronizer as provided in claim 1, wherein said synchronizer circuit means includes:

bypass means coupled to said synchronizer circuit means for selectively bypassing synchronization.

3. The synchronizer as provided in claim 1, wherein said synchronizer circuit means comprises:

a plurality of synchronizer module circuits, wherein each of said plurality of synchronizer module circuits is capable of synchronizing said signals to be synchronized; and synchronizer selector means for coupling, in a predetermined order, said signals to be synchronized to said plurality of single synchronizer modules.

4. A synchronizer for synchronizing signals coupled from a first clock domain operating in accordance with a first clock with a first clock signal having a first frequency, to a second clock domain operating in accordance with a second clock with a second clock signal having second clock pulses at a second frequency, said synchronizer comprising:

a first synchronizer circuit for synchronizing said signals to be synchronized, said first synchronizer circuit comprised of a plurality of transparent latches;

clock circuit means, coupled to said first synchronizer circuit, for generating a plurality of different clock signals, said plurality of different clock signals including a first master clock signal having at least one first master clock pulse in phase with said second clock signal, and a first slave clock signal having at least one first slave clock pulse 180 degrees out of phase with said second clock signal; and bypass means coupled to said first synchronizer circuit for selectively bypassing synchronization.

5. The synchronizer as provided in claim 4, wherein said synchronizer further comprises:

a second synchronizer circuit for synchronizing said signals to be synchronized, said second synchronizer circuit comprised of a second plurality of transparent latches;

wherein said first synchronizer circuit and said clock circuit means are coupled to said second synchronizer circuit.

6. The synchronizer as provided in claim 5, further comprising:

synchronizer selector circuit means for selectively coupling said signals to be synchronized to said first synchronizer circuit and said second synchronizer circuit.

7. The synchronizer as provided in claim 6 wherein said synchronizer selector circuit means selectively couples said signals to be synchronized in a round robin fashion.

8. A method for synchronizing signals coupled from a first clock domain operating in accordance with a first clock with a first clock signal having a first frequency to a second clock domain operating in accordance with a second clock with a second clock signal having second clock pulses at a second frequency, said method comprising the steps of:

providing said signals to be synchronized to a plurality of synchronizer module circuits, each of said synchronizer module circuits capable of separately synchronizing said signals;

utilizing a plurality of different clock signals to synchronize said signals, said plurality of different clock signals including a first master clock signal having at least one first master clock pulse in phase with said second clock signal, and a first slave clock signal having at least one first slave clock pulse 180 degrees out of phase with said second clock signal.

9. The method for synchronizing signals as provided in claim 8 wherein said step of utilizing a plurality of different clock signals, in conjunction with a synchronizer circuit, to synchronize said signals further includes:

selectively providing said signals to be synchronized to said plurality of synchronizer module circuits in a predetermined order.

* * * * *